United States Patent Office 3,770,826
Patented Nov. 6, 1973

3,770,826
N,N'-THIO-BIS-CARBAMIC ACID AMIDES
Rüdiger Schubart and Ernst Roos, Cologne, and Manfred Abele, Porz, Germany, assignors to Bayer Aktiengesellschaft, Leverkusen, Germany
No Drawing. Original application Nov. 18, 1970, Ser. No. 90,859, now Patent No. 3,671,503. Divided and this application Dec. 10, 1971, Ser. No. 206,869
Int. Cl. C07c *103/30*
U.S. Cl. 260—558 S     4 Claims

ABSTRACT OF THE DISCLOSURE

N,N'-thio-bis-carbamic acid amides, their preparation by reacting at least 2 mols of a carboxylic acid amide with 1 mol of sulphur dichloride in the presence of an acid binding agent and their utility as rubber vulcanization retarders.

CROSS REFERENCE TO RELATED APPLICATION

This application is a divisional application of Ser. No. 90,859 filed Nov. 18, 1970, and now U.S. Pat. 3,671,503.

The present invention relates to the use of N,N'-thio-bis-carboxylic acid amides as vulcanisation retarders in the production and processing of mixtures based on natural or synthetic rubber. The invention also relates to new N,N'-thio-bis-carboxylic acid amides and their preparation.

In the production and processing of rubber mixtures which contain vulcanising agents, e.g. sulphur and accelerators, a certain amount of premature vulcanisation, known as scorching, may occur before the proper vulcanisation (see Bayer-Mitteilungen für die Gummi-Industrie, No. 42 of Jan. 5, 1968, pp. 3–7, in particular page 3, left-hand column). This scorching may occur, for example, in the mixer or during any of the subsequent processes such as extruding or calendering.

It is known that the risk of scorching can be reduced by the addition of a N-nitrosoamine, especially N-nitrosodiphenylamine, to the rubber mixture (see Technical Information R 22 "Rubber Chemicals" of Imperial Chemical Industries, Manchester, England, pp. 1–11, in particular page 1; Rubber Chemistry and Technology, vol. 30 (1957), pp. 1291–1346, in particular page 1302, lines 3 and 4; Rubber Journal, March 1967, p. 11, right-hand column, paragraph 2, in particular line 18 of the right-hand column).

In certain circumstances, however, the use of these retarders leads to the formation of porous vulcanisates due to the nitroso group being split off (see Technical Information R 22 "Rubber Chemicals" of Imperial Chemical Industries, Manchester, England, pp. 1–11, in particular page 2, second paragraph). Furthermore, these compounds not only influence the scorching but also have a marked effect on the entire vulcanisation process, i.e. the vulcanisation time is increased (see Bayer Mitteilungen für die Gummi-Industrie, No. 42 of Jan. 5, 1968, pp. 3–7, in particular page 3, right-hand column, lines 39–45, and page 3, right-hand column, last paragraph, in particular lines 47, 48, 55 and 56).

Furthermore, a rather large dose of an N-nitrosoamine is required for achieving a given retarding effect.

It has now been found that N,N'-thio-bis-carboxylic acid amides of the general formula:

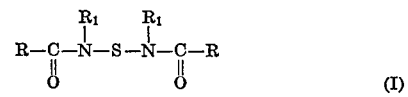

(I)

in which

R and $R_1$ independently of each other represent hydrogen or an alkyl radical, a cycloalkyl radical, an aryl radical optionally substituted by one or more alkyl groups, or an aralkyl radical, and together may form a carbocyclic ring having up to 12 carbon atoms, are suitable for use as vulcanisation retarders in the known methods of producing and processing mixtures which contain natural or synthetic rubber.

The N,N'-thio-bis-carboxylic acid amides surprisingly show a substantially more powerful effect as vulcanisation retarders than the N-nitrosoamines known in the art. Moreover, they do not give rise to porous vulcanisates and, when used in suitable quantities, they have less influence on the time required for complete vulcanisation than have N-nitrosoamines.

The following are examples of radicals R and $R_1$ in the Formula I: unbranched or branched alkyl groups having from 1 to 6 carbon atoms, such as methyl, ethyl, n-propyl, isopropyl, n-butyl, secondary butyl, isobutyl, tertiary butyl, n-pentyl, isoamyl, n-hexyl; the cyclohexylmethyl radical; cycloalkyl groups such as cyclopentyl, cyclohexyl or methylcyclohexyl; aralkyl groups such as benzyl, phenylethyl, phenylpropyl or phenylisopropyl. The following are mentioned as examples of aryl radicals R and $R_1$ which may be substituted by alkyl groups: phenyl, α-naphthyl, methylphenyl, ethylphenyl, n-propylphenyl, isopropylphenyl, n-butylphenyl or tertiary butylphenyl, any of the previously mentioned alkyl groups being either in the ortho-, meta- or para-position of the phenyl radical; also, 2,3-dimethylphenyl,
2,4-dimethylphenyl,
2,5-dimethylphenyl,
2,6-dimethylphenyl,
3,5-dimethylphenyl,
3,4-dimethylphenyl,
2,3-diethylphenyl,
2,4-diethylphenyl,
2,5-diethylphenyl,
2,6-diethylphenyl,
3,4-diethylphenyl,
3,5-diethylphenyl,
2-methyl-3-ethylphenyl,
2-methyl-4-ethylphenyl,
2-methyl-5-ethylphenyl,
2-methyl-6-ethylphenyl,
3-methyl-2-ethylphenyl,
3-methyl-4-ethylphenyl,
3-methyl-5-ethylphenyl,
4-methyl-2-ethylphenyl,
4-methyl-3-ethylphenyl,
5-methyl-2-ethylphenyl, 2,3,4-trimethylphenyl,
3,4,6-trimethylphenyl,
3,4,5-trimethylphenyl,
2,3-dimethyl-4-ethylphenyl,
2,3-dimethyl-5-ethylphenyl,
2,3-dimethyl-6-ethylphenyl,
2,4-dimethyl-3-ethylphenyl,
2,4-dimethyl-5-ethylphenvl,
2,4-dimethyl-6-ethylphenyl,
2,5-dimethyl-3-ethylphenyl,
2,5-dimethyl-4-ethylphenyl,
2,5-dimethyl-6-ethylphenyl,
2,6-dimethyl-3-ethylphenyl,
2,6-dimethyl-4-ethylphenyl,
3,4-dimethyl-2-ethylphenyl,
3,4-dimethyl-5-ethylphenyl,
3,4-dimethyl-6-ethylphenyl,
3,5-dimethyl-4-ethylphenyl,
3,5-dimethyl-6-ethylphenyl,
4-methyl-2,3-diethylphenyl,
5-methyl-2,3-diethylphenyl,
6-methyl-2,3-diethylphenyl,
3-methyl-2,4-diethylphenyl,
5-methyl-2,4-diethylphenyl,
6-methyl-2,4-diethylphenyl,
3-methyl-2,5-diethylphenyl,
4-methyl-2,5-diethylphenyl,
6-methyl-2,5-diethylphenyl,
3-methyl-2,6-diethylphenyl,
4-methyl-2,6-diethylphenyl,
2-methyl-3,4-diethylphenyl,
5-methyl-3,4-diethylphenyl,
6-methyl-3,4-diethylphenyl,
4-methyl-3,5-diethylphenyl,
6-methyl-3,5-diethylphenyl,
2,3,4-triethylphenyl,
2,3,5-triethylphenyl,
2,3,6-triethylphenyl,
2,4,5-triethylphenyl,
2,4,6-triethylphenyl and
3,4,5-triethylphenyl.

The following are mentioned as specific examples of compounds which may be used for the invention:

N,N'-thio-bis-formamide,
N,N'-thio-bis-acetamide,
N,N'-thio-bis-propionamide,
N,N'-thio-bis-(N-methylformamide),
N,N'-thio-bis-(N-methyl acetamide),
N,N'-thio-bis-(n-ethyl acetamide),
N,N'-thio-bis-(N-propyl acetamide),
N,N'-thio-bis-(N-methyl propionamide),
N,N'-thio-bis-(N-ethyl propionamide),
N,N'-thio-bis-(N-methyl butyric acid amide),
N,N'-thio-bis-(N-ethyl butyric acid amide),
N,N'-thio-bis-(N-methyl isobutyric acid amide),
N,N'-thio-bis-(N-ethyl isobutyric acid amide),
N,N'-thio-bis-(N-methyl pentane carboxylic acid amide),
N,N'-thio-bis-(N-cyclohexyl methyl acetamide),
N,N'-thio-bis-(N-cyclopentyl acetamide),
N,N'-thio-bis-(N-cyclohexyl acetamide),
N,N'-thio-bis-(N-methyl cyclohexyl acetamide),
N,N'-thio-bis-(benzyl acetamide),
N,N'-thio-bis-(N-benzyl formamide),
N,N'-thio-bis-(N-phenylethyl acetamide),
N,N'-thio-bis-(N-phenyl formamide),
N,N'-thio-bis-(N-phenyl acetamide),
N,N'-thio-bis-(N-α-naphthyl acetamide),
N,N'-thio-bis-(N-4-methylphenyl acetamide),
N,N'-thio-bis-(N-4-ethylphenyl acetamide),
N,N'-thio-bis-(N-2-methylphenyl acetamide),
N,N'-thio-bis-(N-2-ethylphenyl acetamide),
N,N'-thio-bis-(N-2,3-dimethylphenyl acetamide),
N,N'-thio-bis-(N-2,4-dimethylphenyl acetamide),
N,N'-thio-bis-(N-2,6-dimethylphenyl acetamide),
N,N'-thio-bis-(N-2,5-diethylphenyl acetamide),
N,N'-thio-bis-(N-3,4-diethylphenyl acetamide),
N,N'-thio-bis-(N-2-methyl-4-ethylphenyl acetamide),
N,N'-thio-bis-(N-4-methyl-3-ethylphenyl acetamide),
N,N'-thio-bis-(N-2,3,4-trimethylphenyl acetamide),
N,N'-thio-bis-(N-2,4,6-trimethylphenyl acetamide),
N,N'-thio-bis(N-phenylpropionamide)
N,N'-thio-bis-(N-2-methylphenyl propionamide),
N,N'-thio-bis-(N-benzyl propionamide),
N,N'-thio-bis-(N-phenyl butyric acid amide),
N,N'-thio-bis-benzamide,
N,N'-thio-bis(N-methyl benzamide),
N,N'-thio-bis-(N-ethyl benzamide),
N,N'-thio-bis-(N-propyl benzamide),
N,N'-thio-bis-(N-cyclohexyl benzamide),
N,N'-thio-bis-(N-cyclopentyl benzamide),
N,N'-thio-bis-(N-methylcyclohexyl benzamide),
N,N'-thio-bis-(N-phenylcyclohexane carboxylic acid amide),
N,N'-thio-bis(N-4-methylphenylcyclohexane carboxylic acid amide),
N,N'-thio-bis-(N-phenyl benzamide),
N,N'-thio-bis-(N-4-methylphenyl benzamide),
N,N'-thio-bis-(N-2-methylphenyl benzamide),
N,N'-thio-bis-(N-3-methylphenyl benzamine),
N,N'-thio-bis-(N-phenyl-4-methyl benzamide),
N,N'-thio-bis-(N-2-methylphenylmethyl benzamide),
N,N'-thio-bis-(N-phenyl-2,4,6-trimethyl benzamide),
N,N'-thio-bis-(N-methyl-2,4,6-trimethylbenzamide),
N,N'thio-bis-(N-2-methylphenyl-2,4,6-trimethyl benzamide),
N,N'thio-bis-(N-2,6-dimethylphenyl benzamide),
N,N'-thio-bis-(N-2,4,6-trimethylphenyl benzamide),
N,N'-thio-bis-(N-α-naphthyl benzamide),
N,N'-thio-bis-(N-β-naphthyl benzamide),
N,N'-thio-bis-(N-phenyl-α-naphthalene carboxylic acid amide),
N,N'-thio-bis-(N-α-naphthyl-α-naphthalene carboxylic acid amide),
N,N'-thio-bis-(N-phenyl-α-naphthalene carboxylic acid amide) and
N,N'-thio-bis-(N-phenyl-α-naphthalene carboxylic acid amide).

The following are examples of compounds of Formula I where R and $R_1$ form a carbocyclic ring: N,N'-thio-bis-pyrrolidine-2; N,N'-thio-bis-caprolactam; N,N'-thio-bis-piperidone-2 and N,N'-thio-bis-dodecanelactam.

Suitable rubbers for the production and processing of mixtures based on natural or synthetic rubber are, for example, natural rubber or synthetic rubber-like polymers which are obtained e.g., from conjugated diolefins such as butadiene, dimethylbutadiene, isoprene and its homologues, or copolymers of such conjugated diolefins with polymerisable vinyl compounds such as styrene, α-methyl styrene, acrylonitrile, methacrylonitrile, acrylates or methacrylates.

The retarders used according to the invention may be mixed with the rubber in the conventional manner, for example using mixing rollers or an internal mixer. They are preferably added before or together with the other constituents but they may also be added last. The amount of retarder according to the invention should preferably be from 0.05 to 5.0% by weight, and preferably from 0.1 to 1.5% by weight, based on the rubber.

The rubber mixtures to be treated contain, of course, the conventional additives required for vulcanisation, such as vulcanising agents and accelerators. The vulcanising agent, e.g. sulphur, may be used in the conventional quantity for vulcanisation, generally 0.2 to 5.0% by weight of the rubber. Examples of suitable accelerators are thiazoles such as 2-mercaptobenzothiazole or benzothiazyl sulphenomorpholide, guanidines such as diphenyl guanidine or di-o-tolyl-guanidine, dithiocarbamates such as diethyldithiocarbamic acid zinc, and thiurams such as tetramethyl thiuramic disulphide or tetramethyl thiuramic monosulphide. Mixtures of accelerators may also be used. The accelerator is generally used in a quantity of from 0.05 to 5% by weight, preferably 0.05 to 2.5% by weight, and in particular 0.1 to 1.5% by weight, based on the rubber.

The rubber mixture may also contain other known auxiliary substances, e.g. active or inactive fillers such as chalk or carbon black, antioxidants, antiozonants, waxes, pigments, zinc oxides, fatty acids such as stearic acid or processing oils.

Vulcanisation of the rubber may be carried out by heating the rubber to the usual temperatures, preferably to a temperature of from 120° C. to 170° C., although higher or lower temperatures may also be employed.

The invention also relates to new N,N'-thio-bis-carboxylic acid amides of the formula:

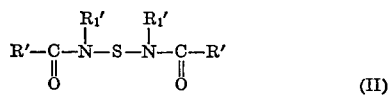

(II)

in which

R' and $R_1'$ represent, independently of each other, hydrogen or an alkyl radical, a cycloalkyl radical, an aryl radical which may be substituted by one or more alkyl groups, or an aralkyl radical.

The following are examples of the radicals R' and $R_1'$: straight chained or branched alkyl groups having 1 to 6 carbon atoms, such as methyl, ethyl, n-propyl, isopropyl, n-butyl, secondary butyl, isobutyl, tertiary butyl, n-pentyl, isoamyl, n-hexyl; the cyclohexylmethyl radical; cycloalkyl groups such as the cyclopentyl, cyclohexyl or methylcyclohexyl groups; aralkyl groups such as benzyl, phenylethyl, phenylpropyl or phenylisopropyl. The following are examples of suitable aryl radicals R' and $R_1'$; optionally substituted by one or more alkyl groups: phenyl, α-naphthyl, methylphenyl, ethylphenyl, n-propylphenyl. isopropylphenyl, n-butylphenyl and tertiary butylphenyl, all these alkyl groups being either in the ortho-, meta- or para-position of the phenyl radical; furthermore:

2,3-dimethylphenyl,
2,4-dimethylphenyl,
2,5-dimethylphenyl,
2,6-dimethylphenyl,
3,5-dimethylphenyl,
3,4-dimethylphenyl,
2,3-diethylphenyl,
2,4-diethylphenyl,
2,5-diethylphenyl,
2,6-diethylphenyl,
3,4-diethylphenyl,
3,5-diethylphenyl,
2-methyl-3-ethylphenyl,
2-methyl-4-ethylphenyl,
2-methyl-5-ethylphenyl,
2-methyl-6-ethylphenyl,
3-methyl-2-ethylphenyl,
3-methyl-4-ethylphenyl,
3-methyl-5-ethylphenyl,
4-methyl-2-ethylphenyl,
4-methyl-3-ethylphenyl,
5-methyl-2-ethylphenyl,
2,3,4-trimethylphenyl,
3,4,6-trimethylphenyl,
3,4,5-trimethylphenyl,
2,3-dimethyl-4-ethylphenyl,
2,3-dimethyl-5-ethylphenyl,
2,3-dimethyl-6-ethylphenyl,
2,4-dimethyl-3-ethylphenyl,
2,4-dimethyl-5-ethylphenyl,
2,4-dimethyl-6-ethylphenyl,
2,5-dimethyl-3-ethylphenyl,
2,5-dimethyl-4-ethylphenyl,
2,5-dimethyl-6-ethylphenyl,
2,6-dimethyl-3-ethylphenyl,
2,6-dimethyl-4-ethylphenyl,
3,4-dimethyl-2-ethylphenyl,
3,4-dimethyl-5-ethylphenyl,
3,4-dimethyl-6-ethylphenyl,
3,5-dimethyl-4-ethylphenyl,
3,5-dimethyl-6-ethylphenyl,
4-methyl-2,3-diethylphenyl,
5-methyl-2,3-diethylphenyl,
6-methyl-2,3-diethylphenyl,
3-methyl-2,4-diethylphenyl,
5-methyl-2,4-diethylphenyl,
6-methyl-2,4-diethylphenyl,
3-methyl-2,5-diethylphenyl,
4-methyl-2,5-diethylphenyl,
6-methyl-2,5-diethylphenyl,
3-methyl-2,6-diethylphenyl,
4-methyl-2,6-diethylphenyl,
2-methyl-3,4-diethylphenyl,
5-methyl-3,4-diethylphenyl,
6-methyl-3,4-diethylphenyl,
4-methyl-3,5-diethylphenyl,
6-methyl-3,5-diethylphenyl,
2,3,4-triethylphenyl,
2,3,5-triethylphenyl,
2,3,6-triethylphenyl,
2,4,5-triethylphenyl,
2,4,6-triethylphenyl and
3,4,5-triethylphenyl.

The following are specific examples of new compounds of the Formula II:

N,N'-thio-bis-formamide,
N,N'-thio-bis-acetamide,
N,N'-thio-bis-propionamide,
N,N'-thio-bis-(N-methyl formamide),
N,N'-thio-bis-(N-methyl acetamide),
N,N'-thio-bis-(N-ethyl acetamide),
N,N'-thio-bis-(N-propyl acetamide),
N,N'-thio-bis-(N-methyl propionamide),
N,N'-thio-bis-(N-ethyl propionamide),
N,N'-thio-bis-(N-methyl butyric acid amide),
N,N'-thio-bis-(N-ethyl butyric acid amide),
N,N'-thio-bis-(N-methyl isobutyric acid amide),
N,N'-thio-bis-(N-ethyl isobutyric acid amide),
N,N'-thio-bis-(N-methyl pentane carboxylic acid amide),
N,N'-thio-bis-(N-cyclohexylmethyl acetamide),
N,N'-thio-bis-(N-cyclopentyl acetamide),
N,N'-thio-bis-(N-cyclohexyl acetamide),
N,N'-thio-bis-(N-methylcyclohexyl acetamide),
N,N'-thio-bis-(benzyl acetamide),
N,N'-thio-bis-(N-benzyl formamide),
N,N'-thio-bis-(N-phenylethylacetamide),
N,N'-thio-bis-(N-phenyl formamide),
N,N'-thio-bis-(N-phenyl acetamide),
N,N'-thio-bis-(N-α-naphthyl acetamide),
N,N'-thio-bis-(N-4-methylphenyl acetamide),
N,N'-thio-bis-(N-4-ethylphenyl acetamide),
N,N'-thio-bis-(N-2-ethylphenyl acetamide),
N,N'-thio-bis-(N-2,3-dimethylphenyl acetamide),
N,N'-thio-bis-(N-2,4-dimethylphenyl acetamide),
N,N'-thio-bis-(N-2,6-dimethylphenyl acetamide),
N,N'-thio-bis-(N-2,5-diethylphenyl acetamide),
N,N'-thio-bis-(N-3,4-diethylphenyl acetamide),
N,N'-thio-bis-(N-2-methyl-4-ethylphenyl acetamide),
N,N'-thio-bis-(N-4-methyl-3-ethylphenyl acetamide),
N,N'-thio-bis-(N-2,3,4-trimethylphenyl acetamide),
N,N'-thio-bis(N-2,4,6-trimethylphenyl acetamide),
N,N'-thio-bis-(N-phenyl propionamide),
N,N'-thio-bis-(N-2-methylphenyl propionamide),
N,N'-thio-bis-(N-benzyl propionamide),
N,N'-thio-bis-(N-butyric acid amide),
N,N'-thio-bis-benzamide, N,N'-thio-bis-(N-methyl benzamide),
N,N'-thio-bis-(N-ethyl benzamide),
N,N'-thio-bis-(N-propyl benzamide),
N,N'-thio-(N-cyclohexyl benzamide),
N,N'-thio-bis-(N-cyclopentyl benzamide),
N,N'-thio-bis-(N-methylcyclohexyl benzamide),
N,N'-thio-bis-(N-phenylcyclohexane carboxylic acid amide),
N,N'-thio-bis-(N-4-methylphenyl-cyclohexane carboxylic acid amide),
N,N'-thio-bis-(N-phenyl benzamide),
N,N'-thio-bis-(N-4-methylphenyl benzamide),
N,N'-thio-bis-(N-2-methylphenyl benzamide),
N,N'-thio-bis-(N-3-methylphenyl benzamide),
N,N'-thio-bis-(N-phenyl-4-methyl benzamide),
N,N'-thio-bis-(N-2-methylphenylmethyl benzamide),
N,N'-thio-bis-(N-phenyl-2,4,6-trimethylbenzamide),
N,N'-thio-bis-(N-methyl-2,4,6-trimethyl benzamide),
N,N'-thio-bis-(N-2-methylphenyl-2,4,6-trimethyl benzamide),
N,N'-thio-bis-(N-2,6-dimethylphenyl benzamide),
N,N'-thio-bis-(N-2,4,6-trimethylphenyl benzamide),
N,N'-thio-bis-(N-α-naphthyl benzamide),
N,N'-thio-bis-(N-β-naphthyl benzamide),
N,N'-thio-bis-(N-phenyl-α-naphthalene carboxylic acid amide),
N,N'-thio-bis-(N-phenyl-β-naphthalene carboxylic acid amide), and
N,N'-thio-bis-(N-α-naphthyl-α-naphthalene carboxylic acid amide).

The new compounds of the Formula II are prepared by reacting at least 2 mols of a carboxylic acid amide of the formula:

wherein

R' and R$_1$' represent, independently of each other, hydrogen or an alkyl radical, a cycloalkyl radical, an aryl radical, optionally substituted by one or more alkyl groups, or an aralkyl radical, with at least one mol of sulphur dichloride in the presence of an acid binding agent.

The reaction of a compound of the Formula III with sulphur dichloride may be represented by the following reaction scheme:

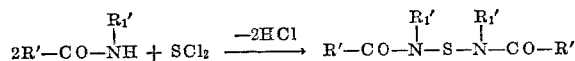

The reaction is carried out at a temperature of from —50° C. to +50° C., preferably at —10° C. to +10° C.

The quantities of the reactants used may vary within wide limits. If a liquid carboxylic acid amide of the Formula III enters into the reaction it may be advisable to use this component in excess, the carboxylic acid amide used then serving also as solvent. In general, however, the reactants are used in equimolecular quantities. If desired, an inert organic solvent or diluent may, of course, be used as the reaction medium. The following are examples of suitable solvents or diluents: hydrocarbons such as light fraction petroleum hydrocarbons, cleaning petrol, hexane, cyclohexane, benzene toluene and xylene; chlorinated hydrocarbons such as methylene chloride, ethylene chloride, chloroform, carbon tetrachloride and chlorobenzene; ethers such as diethyl ether, diisopropyl ether dioxane and tetrahydrofuran; ketones such as acetone, methyl ethyl ketone, diethyl ketone, methyl propyl ketone, methyl butyl ketone di-n-propyl ketone, methylisopropyl ketone and cyclohexanol.

Both inorganic and organic bases are suitable for use as the acid binding agent. As a rule the acid binding agent used is a tertiary amine such as triethylamine, N,N-dimethyl aniline and especially a pyridine base such as pyridine, an alkyl pyridine or quinoline, but an inorganic base such as magnesium oxide, sodium carbonate, potassium carbonate or calcium carbonate may also be used as the acid binding agent in which case, it may be advantageous to add these compounds in a finely divided form. If the acid binding agent is a liquid compound, e.g. pyridine, it may, of course, also serve as a solvent or diluent.

The reactants may be added in any sequence. As a rule carboxylic acid amide and the acid binding agent are introduced into the reaction vessel and sulphur dichloride, optionally dissolved in a solvent, is added thereto. The products are worked up in the usual manner, e.g. by removal of the resulting aminohydrochloride or inorganic chloride (if an inorganic base was used as the acid binding agent) by filtration or washing with water, followed by isolation of the N,N'-thio-bis-carboxylic acid amide. The new compounds are generally colourless, crystalline substances.

The following are examples of acid amides (III) which may be used for the reaction:

formamide,
acetamide,
propionamide,
N-methyl formamide,
N-methyl acetamide,
N-ethyl acetamide,
N-propyl acetamide,
N-methyl propionamide,
N-ethyl propionamide,
N-methyl butyric acid amide,
N-ethyl butyric acid amide,
N-methyl isobutyric acid amide,
N-ethyl isobutyric acid amide,
N-methyl pentane carboxylic acid amide,
N-cyclohexylmethyl acetamide,
N-cyclopentyl acetamide,
N-cyclohexyl acetamide,
N-methylcyclohexyl acetamide,
N-benzyl acetamide,
N-benzyl formamide,
N-phenyl-ethyl acetamide,
N-phenyl formamide,
N-phenyl acetamide,
N-α-naphthyl acetamide,
N-4-methylphenyl acetamide,
N-4-ethylphenyl acetamide,
N-2-methylphenyl acetamide,
N-2-ethylphenyl acetamide,
N-2,3-dimethylphenyl acetamide,
N-2,4-dimethyl phenyl acetamide,
N-2,6-dimethylphenyl acetamide,
N-2,5-diethylphenyl acetamide,
N-3,4-diethylphenyl acetamide,
N-2-methyl-4-ethylphenyl acetamide,
N-4-methyl-3-ethylphenyl acetamide,
N-2,3,4-trimethylphenyl acetamide,
N-2,4,6-trimethylphenyl acetamide,
N-phenyl propionamide,
N-2-methylphenyl propionamide,
N-benzyl propionamide,
N-phenyl butyric acid amide,
benzamide,
N-methyl benzamide,
N-ethyl benzamide,
N-propyl benzamide,
N-cyclohexyl benzamide,
N-cyclopentyl benzamide,
N-methylcyclohexyl benzamide,
N-phenyl cyclohexane carboxylic acid amide, N-4-methylphenylcyclohexane carboxylic acid amide,
N-phenyl benzamide,
N-4-methylphenyl benzamide,
N-2-methylphenyl benzamide,
N-3-methylphenyl benzamide,
N-phenyl-4-methyl benzamide,
N-2-methylphenylmethyl benzamide,
N-phenyl-2,4,6-trimethylbenzamide,
N-methyl-2,4,6-trimethyl benzamide,
N-2-methylphenyl-2,4,6-trimethyl benzamide,
N-2,6-dimethylphenyl benzamide,
N-2,4,6-trimethylphenyl benzamide,
N-α-naphthyl benzamide,
N-β-naphthyl benzamide,
N-phenyl-α-naphthalene carboxylic acid amide,
N-α-naphthyl-α-naphthalene carboxylic acid amide and
N-phenyl-α-naphthalene carboxylic acid amide.

The following example illustrate the invention. The values shown in the tables are parts by weight, based on 100.0 parts by weight of the rubber.

The test methods are defined as follows (see also Kautschuk und Gummi; Kunststoffe 20, No. 3/1967, pages 126-134, in particular pages 127 and 133):

Scorch time: In analogy with the Mooney Scorch time (see DIN 53, 524), time determined from the tension/heating time curve until the tension rises by 20 points above the minimum at 300% elongation (stepwise vulcanisation at 110° C.).

M 300: Tension (kg. wt./cm.$^2$) at 300% elongation according to DIN 53, 504, sheet 2.

F: Tensile strength (kg. wt./cm.$^2$) according to DIN 53, 504, sheet 1, Standard ring R.I.

D: Elongation at break (percent) according to DIN 53, 504 sheet 1, Standard ring R.I.

H: Hardness (Shore A), DIN 53, 505, range A, 4 mm. flaps.

Complete vulcanisation time: Time taken to reach 90% of the maximum tension (at 300% elongation) at 140° C.

EXAMPLE 1.—THE FOLLOWING MIXTURES WERE PREPARED ON MIXING ROLLERS

| Mixture number | 1 | 2 | 3 | 4 | 5 |
|---|---|---|---|---|---|
| Natural rubber, smoked sheets | 100.0 | 100.0 | 100.0 | 100.0 | 100.0 |
| Zinc oxide | 5.0 | 5.0 | 5.0 | 5.0 | 5.0 |
| Stearic acid | 3.0 | 3.0 | 3.0 | 3.0 | 3.0 |
| Aromatic mineral oil plasticiser | 2.5 | 2.5 | 2.5 | 2.5 | 2.5 |
| High abrasion furnace black | 45.0 | 45.0 | 45.0 | 45.0 | 45.0 |
| Naphthenic mineral oil plasticiser | 2.5 | 2.5 | 2.5 | 2.5 | 2.5 |
| Sulphur | 2.3 | 2.3 | 2.3 | 2.3 | 2.3 |
| N-cyclohexyl-2-benzothiazyl sulphenamide | 0.5 | 0.5 | 0.5 | 0.5 | 0.5 |
| N-nitrosodiphenylamine (for comparison) | | 0.6 | | | |
| N,N'-thio-bis-(N-phenyl acetamide) | | | 0.2 | | |
| N,N'-bis-pyrrolidon-(2)-sulphide | | | | 0.3 | |
| N,N'-bis-caprolactam sulphide | | | | | 0.3 |

NOTE.—The mixtures obtained were vulcanised under pressure to produce test samples 4 mm. in thickness, heating being carried out stepwise at 110° C. and 140° C. The results shown in Table I were obtained:

EXAMPLE 2

A solution of 76.5 g. (0.75 mol) of sulphur dichloride in 150 ml. of methylene chloride is introduced dropwise with stirring at 0° C. into a mixture of 202.5 g. (1.5 mol) of N-phenyl acetamide, 124.5 g. (1.575 mol) of pyridine and 750 ml. of methylene chloride. The reaction mixture is stirred for 3 hours and washed thoroughly with water; the methylene chloride solution is dried over Na$_2$SO$_4$ and concentrated by evaporation under vacuum. The residue is recrystallised from isopropanol; M.P. 132° C. to 134° C.

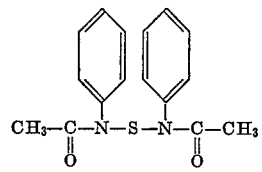

When the amides listed under A in the following Table II are used instead of N-phenyl acetamide, the compounds shown under B are obtained.

TABLE II

| A | B | Melting point, °C. |
|---|---|---|
| (phenyl)-C(CH$_3$)=O, NH | (phenyl)-C(CH$_3$)=O-N-S-N-O=C(CH$_3$)-(phenyl) | 132-134 |
| CH$_3$-C(=O)-NH-CH$_3$ | H$_3$C-C(=O)-N(CH$_3$)-S-N(CH$_3$)-C(=O)-CH$_3$ | 65-66 |
| (phenyl)-C(=O)-NH-CH$_3$ | (phenyl)-C(=O)-N(CH$_3$)-S-N(CH$_3$)-C(=O)-(phenyl) | 95 |
| pyrrolidinone-NH | bis(pyrrolidinone)-N-S-N | 134-136 |
| caprolactam-NH | bis(caprolactam)-N-S-N | 138-139 |

It will be seen that the new retarders added in a dose of 0.2 and 0.3% by weight, respectively, based on 100.0 parts by weight of rubber, have the same retarding effect as N-nitrosodiphenylamine added in an amount of 0.6% by weight. It follows, therefore, that the new retarders are at least twice as effective and in some cases even more so (see Table II).

The time required for complete vulcanisation is invariably less in the case of the compounds prepared according to the invention than in the case of the mixture prepared with N-nitrosodiphenylamine. This shows clearly the very advantageous influence of the compounds used according to the invention on the vulcanisation characteristic.

TABLE I

| Mixture number | Scorch retarder | Scorch time at 110° C. (min.) | Complete vulcanisation time at 140° C. (min.) | F (kg. wt./cm.$^2$) | D (percent) | M 300 (kg. wt./cm.$^2$) | H (Shore A) |
|---|---|---|---|---|---|---|---|
| 1 | None | 63.0 | 22.5 | 240 | 550 | 105 | 61 |
| 2 | N-nitroso-diphenylamine (for comparison) | 84.5 | 28.3 | 220 | 560 | 97 | 60 |
| 3 | N,N'-thio-bis-(N-phenylacetamide) | 83.5 | 24.4 | 210 | 500 | 108 | 62 |
| 4 | N,N'-thio-bis-(pyrrolidone-2) | 85.0 | 24.9 | 230 | 510 | 112 | 62 |
| 5 | N,N'-thio-bis-(caprolactam) | 83.0 | 24.2 | 235 | 530 | 110 | 63 |

What is claimed is:
1. A compound of the formula

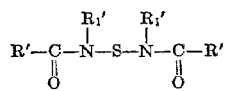

wherein R' and $R_1'$ are, independently of each other, alkyl having from 1 to 6 carbon atoms, cyclohexylmethyl, cycloalkyl having from 5 to 6 carbon atoms, methylcyclohexyl phenylalkyl having from 1 to 3 carbon atoms in the alkyl moiety, phenyl, -naphthyl, monoalkylphenyl having from 1 to 4 carbon atoms in the alkyl moiety, dialkylphenyl having from 1 to 2 carbon atoms in each alkyl moiety and trialkylphenyl having from 1 to 2 carbon atoms in each alkyl moiety.

2. The compound of claim 1 wherein R' is methyl and $R_1'$ is phenyl.
3. The compound of claim 1 wherein each of R' and $R_1'$ is methyl.
4. The compound of claim 1 wherein R' is phenyl and $R_1'$ is methyl.

References Cited

Hope et al., J. Chem. Soc. (London), pp. 5679–83 (1964).

HARRY I. MOATZ, Primary Examiner

U.S. Cl. X.R.

260—239.3 R, 294.8 E, 326.82, 561 R, 562 R, 562 P, 726, 780